United States Patent Office 3,306,331
Patented Feb. 28, 1967

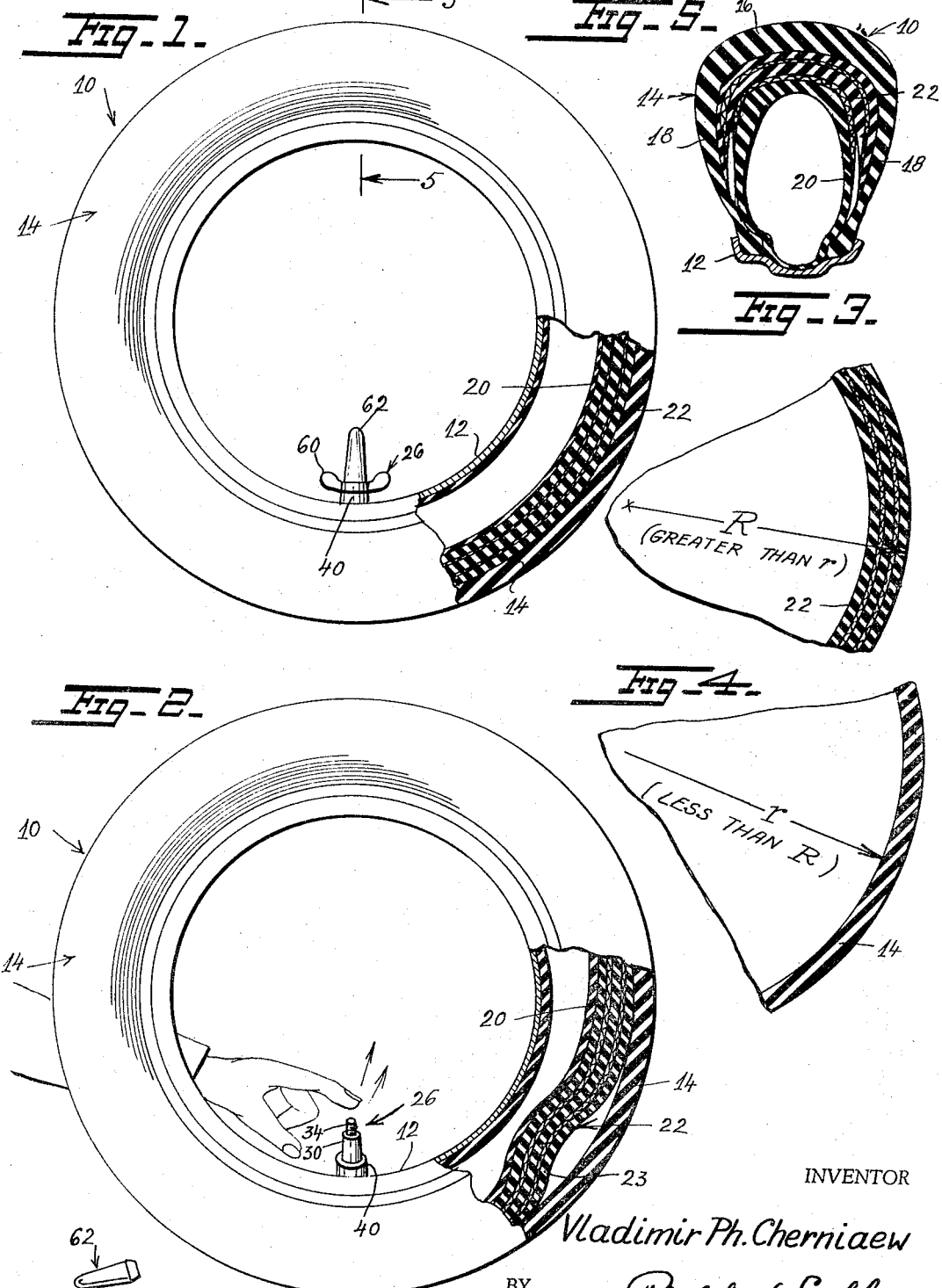

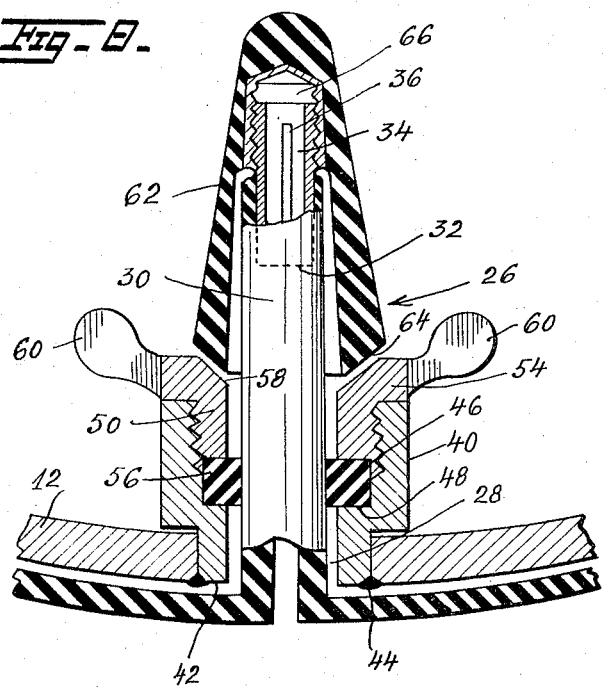
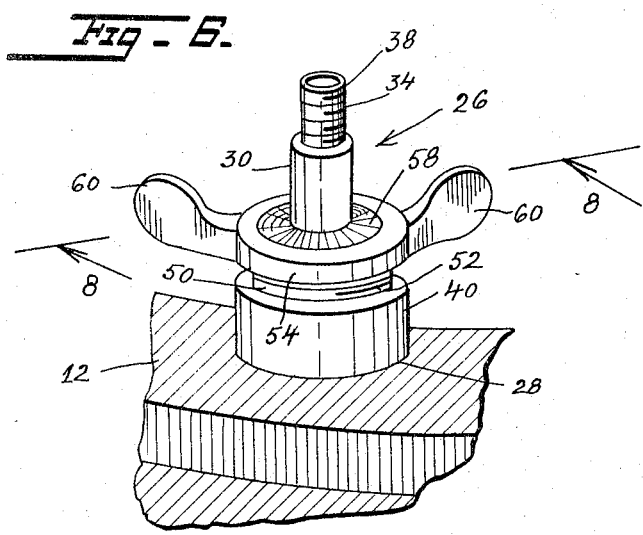
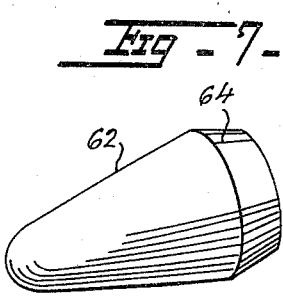
INVENTOR
Vladimir Ph. Cherniaew
BY Polachek & Saulsbury
ATTORNEYS.

3,306,331
INNER TUBE AND TIRE VALVE STEM PROTECTOR
Vladimir Ph. Cherniaew, Brooklyn, N.Y., assignor of fifty percent to David Ratner, Brooklyn, N.Y.
Filed June 28, 1965, Ser. No. 467,248
7 Claims. (Cl. 152—204)

This invention relates generally to tires of vehicles and more particularly to protectors for the inner tubes and for tire valve stem assemblies.

A primary object of the present invention is to provide an inner tube for a tire with protective layers which provide an effective preventive of blowouts.

Another object of the invention is to provide an inner tube with reinforcing means which serves as a protection for the tube and also for the tire casing to which the tube is applied.

Another important object of the present invention is to provide a pneumatic tire valve stem protector to prevent foreign bodies from contacting the tire valve stem.

A further object is to provide sealing means for preventing entrance of dirt, water or other deleterious matter into the space between the inner tube and casing or rim.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side elevational view of a vehicle wheel part of the tire being broken away to show the pneumatic inner tube cover in inflated condition, FIG. 2 is a similar view showing the pneumatic tube tire partly deflated, the valve cover being shown removed, FIG. 3 is a fragmentary sectional view of the protector for the inner tube, showing the radius thereof, FIG. 4 is a similar fragmentary sectional view of the tire tread, showing the radius thereof, the inner radius being less than the outer radius of the expanded cover, FIG. 5 is an enlarged vertical sectional view taken on the line 5—5 of FIG. 1, FIG. 6 is an enlarged top perspective view of the valve stem assembly, in partly untightened condition, the cover being shown removed, FIG. 7 is a detail elevational view of the valve stem assembly cover, and FIG. 8 is an enlarged vertical sectional view taken on the line 8—8 of FIG. 6 showing the valve stem assembly parts in tightened condition and the cover in operative position.

Referring now in detail to the various views of the drawings, in FIG. 1 there is shown a tire 10 mounted on a metal wheel rim 12. The tire has a thick outer rubber tire casing 14 with a thick thread portion 16 and integral side walls 18, 18. A rubber tube 20 is shown inside the tire casing. Interposed between the tire casing 14 and the tube 20, there is a resilient puncture-sealing ring structure 22. The ring structure 22 comprises a plurality of concentric layers 23 of soft rubber, either cemented to each other or not. Two or more layers may be used. The outer diameter of the ring structure 22 is greater than the inner diameter of the tire casing 14 as will be seen from FIGS. 3 and 4. The inner tube 20 may be of any desired size.

In assembling the tire, talcum, silicon or Teflon is dusted on the inner periphery of the tire casing 14. The ring structure 22 is placed inside the tire casing 14 and next the tube 20 is placed inside the ring structure. The ring structure is cemented to the tire casing 14 preferably by rubber cement with emery dust but rubber cement alone may also be used. The ring structure 22 may also be cemented to the inner tube 20. Furthermore, the ring structure 22 may be roughened on the inside and on the outside, and the tube 20 may be roughened on the outside. The ring structure may also be used with either old or new tires, and is bought separate from the tire. When the tube 20 is inflated, the tube and tire casing 14 expand and the ring structure 22 opens or expands to the full extent of its diameter, compressing against and accommodating itself to the expanded tire casing 14, thereby protecting the tube 20 and automatically sealing any punctures in the tire casing 14 caused by tacks, nails and the like.

A valve stem assembly 26 for controlling the inflation of the inner tube 20 of the tire is shown mounted on the wheel rim 12. The present invention contemplates mounting the valve stem assembly on the wheel rim in sealed condition so as to prevent leakage of air therearound. The valve stem assembly 26 extends through an opening 28 in the wheel rim 12.

The valve stem assembly 26 includes a tubular extension 30 formed integral with the inner rubber tube 20 and projecting outwardly through the opening 28 in the wheel rim 12. The upper end of the extension 30 is open and is thinned out forming a shoulder 32 constituting a seat for the bottom end of a tubular valve member 34 provided with a narrow slot 36 extending longitudinally thereof and provided with external screw threads 38 at its top end projecting outwardly of the top of the tubular extension 30. A ring member 40 is seated on the rim 14 around the opening 28 in the rim 14 and is provided with a reduced end portion 42 extending through the opening and welded to the bottom of the wheel rim around the opening as indicated at 44. The ring member 40 is formed with internal screw threads 46 and with an inner shoulder 48. An annular nut member 50 with external screw threads 52 on the outer surface of its body and with an annular flange 54 on the top end thereof is threaded into the ring member 40, and interposed between the nut member 50 and ring member 40 there is a rubber gasket 56 seated on the shoulder 48 on the ring member and compressed between the nut member and ring member for sealing said members at this point. At the top end of the inner periphery of the nut member 50, the material of the nut member is cutaway and corrugated forming a downwardly and inwardly slanting shoulder 58, around the nut member. A pair of opposed radially extending finger pieces 60, 60 are integrally formed on the outer periphery of the flange 58 of the nut member for actuating and manipulating the nut member.

An elongated conical shaped rubber cover or cap member 62 is provided for covering the exposed portion of the tubular member 34. The bottom end edge of the body of the cover as viewed in FIG. 8 is tapered inwardly and downwardly as indicated at 64 to complement the inwardly and downwardly taper 58 on the nut 50 whereby the bottom end is accommodated. An internally screw threaded sleeve 66 lines the inner surface of the cap or cover at its closed end is adapted to be threaded onto the external threads 38 of the valve member 34 in order to hold the cap or cover in closed position on the valve member.

In assembling, the finger pieces 60, 60 permit ready turning of the nut member 50 into the ring 40 to connect the nut and ring member in sealed condition. The cap or cover 62 is quickly threaded onto the tubular valve member 34. When the cap or cover is on the valve stem member is sealed against escape of air.

In order to inflate the inner tube 20 and tire casing 14 it is only necessary to unscrew the cap or cover 62 off of the valve member 34 and attach an air hose or the like to the valve member 34.

The cap or cover 62 prevents air or dirt entering the inner tube 20 and prevents air from escaping therefrom.

While I have illustrated and described the preferred embodiment of my invention, it is to be understood that I do not limit myself to the precise constructions herein disclosed and that various changes and modifications may be made within the scope of the invention as defined in the appended claims.

Having thus described my invention, what I claim as new and desire to secure by United States Letters Patent is:

1. In a wheel for a vehicle, a circular rim having a hole therein, a tire on the rim, said tire including an outer tire casing, an inner tube in the casing, a protective ring structure interposed between the tube and tire casing, a valve assembly carried by the tube, said valve assembly including a tubular member extending radially of the inner tube projecting through the hole in the rim, said tubular member being open at the outer end thereof, a tubular valve member fitted in the outer open end of the tubular member, said valve having an elongated slot therealong, an internally threaded ring member fitted in said hole, and sleeved around said tubular member, a nut member threaded into said ring member, said ring member having a tapered top, and a conical cover removably fitted on the tubular valve member and adapted to seat on the tapered top of the nut member for sealing the slot in the valve member.

2. In a wheel for a vehicle, a circular rim having a hole therein, a tire on the rim, said tire including an outer tire casing, an inner tube in the casing, a protective ring structure interposed between the tube and tire casing, a valve assembly carried by the tube, said valve assembly including a tubular member extending radially of the inner tube projecting through the hole in the rim, said tubular member being open at the outer end thereof, a tubular valve member fitted in the outer open end of the tubular member, said valve having an elongated slot therealong, an internally threaded ring member fitted in said hole, and sleeved around said tubular member, a nut member threaded into said ring member, said ring member having a tapered top, and a conical cover removably fitted on the tubular valve member and adapted to seat on the tapered top of the nut member for sealing the slot in the valve member, and finger pieces on the nut member for manually turning the nut member.

3. In a wheel for a vehicle, a circular rim having a hole therein, a tire on the rim, said tire including an outer tire casing, an inner tube in the casing, a protective ring structure interposed between the tube and tire casing, a valve assembly carried by the tube, said valve assembly including a tubular member extending radially of the inner tube projecting through the hole in the rim, said tubular member being open at the outer end thereof, a tubular valve member fitted in the outer open end of the tubular member, said valve having an elongated slot therealong, an internally threaded ring member fitted in said hole, and sleeved around said tubular member, a nut member threaded into said ring member, said ring member having a tapered top, and a conical cover removably fitted on the tubular valve member and adapted to seat on the tapered top of the nut member for sealing the slot in the valve member, said cover and nut member having complementary opposed tapering surfaces, the nut surface having corrugations for enhancing the sealing performance thereof.

4. In a wheel for a vehicle, a circular rim having a hole therein, a tire on the rim, said tire including an outer tire casing, an inner tube in the casing, a protective ring structure interposed between the tube and tire casing, a valve assembly carried by the tube, said valve assembly including a tubular member extending radially of the inner tube projecting through the hole in the rim, said tubular member being open at the outer end thereof, a tubular valve member fitted in the outer open end of the tubular member, said valve having an elongated slot therealong, an internally threaded ring member fitted in said hole and sleeved around said tubular member, a nut member threaded into said ring member, said ring member having a tapered top, and a conical cover removably fitted on the tubular valve member and adaped to seat on the tapered top of the nut member for sealing the slot in the valve member, and a rubber gasket interposed between the ring member and nut member for sealing the valve device.

5. In a wheel for a vehicle, a circular rim having a hole therein, a tire on the rim, said tire including an outer tire casing, an inner tube in the casing, a protective ring structure interposed between the tube and tire casing, a valve assembly carried by the tube, said valve assembly including a tubular member extending radially of the inner tube projecting through the hole in the rim, said tubular member being open at the outer end thereof, a tubular valve member fitted in the outer open end of the tubular member, said valve having an elongated slot therealong, an internally threaded ring member fitted in said hole, and sleeved around said tubular member, a nut member threaded into said ring member, said ring member having a tapered top, and a conical cover removably fitted on the tubular valve member and adapted to seat on the tapered top of the nut member for sealing the slot in the valve member, and finger pieces on the nut member for manually turning the nut member, said cover and nut member having complementary opposed tapering surfaces, the nut surface having corrugations for enhancing the sealing performance thereof, and a rubber gasket interposed between the ring member and nut member for sealing the valve device.

6. In a wheel for a vehicle, a circular rim having a hole therein, a tire on the rim, said tire including an outer tire casing, an inner tube in the casing, a protective rubber ring structure between the outer casing and inner tube, a valve stem assembly seated on the rim around the hole therein, said valve stem assembly including an elongated tubular member formed integrally with the inner tube and being open at both ends and extending through the hole in the rim to the inside thereof, a tubular valve member fitted in the outer end of the tubular member, said valve member having an elongated slot therealong, a ring member sleeved around said tubular member and fitted in the hole in the rim, said ring member having internal screw threads and a shoulder therein, a nut member threaded into the ring member meshing with the internal screw threads thereon, a gasket interposed between the ring member and nut member and being seated on the shoulder on the ring member, and inner periphery of the gasket contacting the outer surface of the tubular member on the inner tube for sealing the tubular member, and an elongated protective rubber cover removably mounted on the tubular valve member, said cover and nut member having cooperating tapering slanting surfaces for sealing the opening in the nut member.

7. In a wheel for a vehicle, a circular rim having a hole therein, a tire on the rim, said tire including an outer tire casing, an inner tube in the casing, a protective rubber ring structure between the outer casing and inner tube, a valve stem assembly seated on the rim around the hole therein, said valve stem assembly including an elongated tubular member formed integrally with the inner tube and being open at both ends and extending through the hole in the rim to the inside thereof, a tubular valve member fitted in the outer end of the tubular member, said valve member having an elongated slot therealong, a ring member sleeved around said tubular member and fitted in the hole in the rim, said ring member having internal screw threads and a shoulder therein, a nut member threaded into the ring member meshing with the internal screw threads thereon, a gasket interposed between the ring member and nut member and being seated on the shoulder on the ring member, and inner periphery of the gasket contacting the outer surface of the tubular member on the inner tube for sealing the tubular member, and an elongated protective rubber cover removably mounted on the tubular valve member, said cover and nut member having cooperating tapering slanting surfaces for sealing the opening in the nut member, and finger pieces on the nut member for turning the same.

References Cited by the Examiner

UNITED STATES PATENTS

| | | | |
|---|---|---|---|
| 2,154,828 | 4/1939 | Ambuhl | 152—204 |
| 2,550,773 | 5/1951 | Christensen et al. | 152—204 X |
| 2,678,077 | 5/1954 | Atkinson. | |

FOREIGN PATENTS 649,191  1/1951  Great Britain.

ARTHUR L. LA POINT, *Primary Examiner.*

C. W. HAEFELE, *Assistant Examiner.*